United States Patent
Becker et al.

(10) Patent No.: US 9,057,366 B2
(45) Date of Patent: Jun. 16, 2015

(54) DIAPHRAGM PUMP

(75) Inventors: Erich Becker, Bad Krozingen (DE); Erwin Hauser, Emmendingen (DE)

(73) Assignee: KNF Neuberger GmbH, Freiburg (DE)

( * ) Notice: Subject to any disclaimer, the term of this patent is extended or adjusted under 35 U.S.C. 154(b) by 478 days.

(21) Appl. No.: 13/581,385

(22) PCT Filed: Nov. 16, 2010

(86) PCT No.: PCT/EP2010/006968
§ 371 (c)(1),
(2), (4) Date: Nov. 7, 2012

(87) PCT Pub. No.: WO2011/103890
PCT Pub. Date: Sep. 1, 2011

(65) Prior Publication Data
US 2013/0042753 A1   Feb. 21, 2013

(30) Foreign Application Priority Data

Feb. 27, 2010   (DE) .......................... 10 2010 009 670

(51) Int. Cl.
*F04B 43/02*   (2006.01)
*F04B 43/00*   (2006.01)
*F16J 3/02*    (2006.01)

(52) U.S. Cl.
CPC .............. *F04B 43/0054* (2013.01); *F04B 43/02* (2013.01); *F16J 3/02* (2013.01)

(58) Field of Classification Search
CPC .......... F04B 43/0054; F04B 43/02; F16J 3/02
See application file for complete search history.

(56) References Cited

U.S. PATENT DOCUMENTS 3,947,156 A * 3/1976 Becker ............................... 92/99
4,086,036 A * 4/1978 Hagen et al. ...................... 92/99
(Continued)

FOREIGN PATENT DOCUMENTS

DE   9403103   4/1994
EP   1058005   12/2000
EP   1460270   9/2004

*Primary Examiner* — Thomas E Lazo
(74) *Attorney, Agent, or Firm* — Volpe and Koenig, P.C.

(57) ABSTRACT

A diaphragm pump (1) which has in at least one pump head (2) a working or pump diaphragm (3) which, by means of a clamping zone (4) arranged at its outer circumference, is clamped between two housing parts (5, 6) of a pump housing and which, between itself and a pump head part (6), borders a working or delivery chamber (8) and which, in a central zone (10), surrounds a diaphragm armature (11) which, on a side facing away from the working or delivery chamber (8) of the at least one pump head (2), is connected to a reciprocating drive (12) which is provided for generating an oscillating stroke movement of the working or pump diaphragm (3). The diaphragm pump according to the invention is characterized in that the annular zone arranged adjacent to the clamping zone (4) is formed as a guide zone (14) which, in the unloaded state of the working or pump diaphragm, is convexly curved and projects into the working or delivery chamber (8), with which guide zone (14) the working or pump diaphragm (3) rolls on a complementarily shaped annular or support zone (15) of the pump head (2) during the stroke movement of the working or pump diaphragm (3), and that a compensation zone (16) of the working or pump diaphragm (3) is provided between the guide zone (14) and the central zone (10), which compensation zone, in the unloaded state, is in contrast curved concavely and in the direction of the stroke drive (12). The diaphragm pump according to the invention is characterized by improved pump performance, a long service life and quiet and low-vibration pump operation.

13 Claims, 3 Drawing Sheets

(56) References Cited

U.S. PATENT DOCUMENTS

| | | | |
|---|---|---|---|
| 4,181,477 A * | 1/1980 | Litt | 417/560 |
| 5,275,541 A * | 1/1994 | Becker et al. | 417/413.1 |
| 5,634,391 A * | 6/1997 | Eady | 92/98 R |
| 5,791,882 A * | 8/1998 | Stucker et al. | 417/269 |
| 6,883,417 B2 * | 4/2005 | Headley et al. | 92/99 |
| 8,287,249 B2 * | 10/2012 | Fuksa et al. | 417/245 |

* cited by examiner

DIAPHRAGM PUMP

BACKGROUND

The invention relates to a diaphragm pump which has a pump diaphragm in at least one pump head, which pump diaphragm is clamped by way of a clamping zone which is arranged on its outer circumference between two housing parts of a pump housing and defines a delivery space between itself and a pump head part, and which encloses, in a central zone, a diaphragm armature, the annular zone which is arranged adjacently to the clamping zone being configured as a guide zone which, in the unloaded state of the pump diaphragm, is curved convexly and projects into the delivery space.

The previously known diaphragm pumps have at least one pump head which is assigned a working or pump diaphragm. The outer circumferential edge region of said working or pump diaphragm is configured as a clamping zone, by way of which the working or pump diaphragm is clamped between two housing parts of the pump housing in such a way that the working or pump diaphragm defines a working or delivery space between itself and a pump head part. A metal diaphragm armature is vulcanized in regions into a central diaphragm zone, which diaphragm armature is connected to a reciprocating drive on its side which faces away from the working or delivery space. With the aid of said reciprocating drive, the working or pump diaphragm of the at least one pump head can be set into an oscillating reciprocating movement.

Various diaphragm embodiments are already known previously as working or delivery diaphragms. Thus, at the top dead center of the reciprocating movement, what is known as the shaped diaphragm is capable of bearing positively against the dome-shaped working or delivery space of the associated diaphragm pump. Firstly, working or pump diaphragms of this type have to be of sufficiently elastic configuration, in order to withstand the forces which act on them as a result of the tumbling movement of the diaphragm during the pump operation; at the same time, said working or pump diaphragms also have to be sufficiently dimensionally stable, in order not to be deformed in a manner which reduces performance by the opposed pressure forces which act on the opposite diaphragm sides during the pump operation. What are known as structured diaphragms have therefore also been produced which, on their diaphragm side which faces away from the working or pump space, have structures which are formed by concentric webs and radial ribs and permit a defined tumbling movement of the structured diaphragms during the pump operation.

EP 1 460 270 A2 has already disclosed a diaphragm pump which is operated with compressed air and which therefore does not have an eccentric as reciprocating drive, which eccentric would be provided for the oscillating reciprocating movement of the pump diaphragm. On opposite sides of its pump housing, the previously known diaphragm pump which is operated with compressed air has in each case one pump diaphragm which is clamped sealingly in the pump housing by way of its outer edge region which is configured as a clamping zone. The pump diaphragms have a central zone, into which a diaphragm armature is formed integrally, the diaphragm armatures of the pump diaphragms which are provided on both sides being connected to one another via a connecting web. A convexly curved guide zone which projects into the adjacent working space is configured between the central zone and the clamping zone. Since, however, the diaphragm pump which is already known from EP 1 460 270 A2 does not have an eccentric drive, the convexly curved annular zone of the previously known diaphragm pump also cannot and does not have to roll on an annular zone of the pump head. Further zones are not configured in the pump diaphragm which is used in EP 1 460 270 A2.

U.S. Pat. No. 5,634,391, EP 1 058 005 A2 or DE 94 03 103 U1 has already disclosed pump diaphragms for a diaphragm pump which have a convexly curved annular zone which projects into the working space between their outer edge region which serves as a clamping zone and a central region. Since the abovementioned documents are concerned merely with the design of the pump diaphragm, said documents do not mention in greater detail whether the previously known pump diaphragms are intended to bear with said convexly curved annular zone against that inner wall of a pump housing which defines the delivery space and, in particular, are intended to roll thereon during the reciprocating movement. Further annular zones are also not configured in the pump diaphragms according to the previously known documents.

SUMMARY

However, there is the object, furthermore, of providing a diaphragm pump of the type mentioned at the outset, in which diaphragm pump the working or pump diaphragm is adapted to the working or delivery space which is assigned to it, in such a way that the diaphragm pump according to the invention is distinguished by improved pump performance, a long service life and by quiet and low-vibration pump operation.

In the diaphragm pump of the type mentioned at the outset, this object is achieved according to the invention, in particular, by the fact that, on its side which faces away from the delivery space of the at least one pump head, the diaphragm armature is connected to a reciprocating drive which is provided for the oscillating reciprocating movement of the pump diaphragm, that the pump diaphragm rolls with its guide zone on a complementarily formed annular or supporting zone of the pump head during the reciprocating movement of the pump diaphragm, and that a compensation zone of the pump diaphragm is provided between the guide zone and the central zone, which compensation zone is curved concavely and in the direction of the reciprocating drive in contrast in the unloaded state.

The working or pump diaphragm which is used in the diaphragm pump according to the invention has a plurality of diaphragm zones which are in each case designed for a certain purpose. For instance, the annular region which lies on the outer circumference of the diaphragm is configured as a CLAMPING ZONE, by way of which the diaphragm is clamped between two housing parts of the pump housing and is held in a sealing manner on the circumferential side. With the aid of said clamping zone, the relative position of the diaphragm and its diaphragm zones is fixed onto the pump head and its shape which is adapted to the diaphragm zones. The clamping zone therefore serves to center and/or position the working or pump diaphragm in relation to the pump head. Moreover, it ensures a satisfactory sealing action of the working or delivery space with respect to the reciprocating drive which is situated, for example, in a crankcase.

This clamping zone is adjoined toward the diaphragm center by a GUIDE ZONE which, in the unloaded state of the working or pump diaphragm, is curved convexly in such a way that said annular zone which is arranged adjacently to the clamping zone projects beyond the clamping zone into the working or delivery space. During the reciprocating movement, the working or pump diaphragm rolls on a complementarily formed annular or SUPPORTING ZONE of the pump head. Here, the diaphragm is supported, by way of its guide zone which is intended to guide the diaphragm, on the supporting zone of the pump head progressively from the outside to the inside, with the result that the radial forces in the working or pump diaphragm which are necessary to increase the radius are absorbed progressively reliably and without vibration by the supporting zone. The support of the working or pump diaphragm on the pump head, which support is progressive from the diaphragm outer circumference in the direction to the inside during the reciprocating movement, additionally ensures the correct positioning firstly of the zones of the diaphragm which correspond with one another and secondly of the pump head in the region of the working or delivery space. In combination with the adapted geometry of the pump head, the convex configuration of the guide zone leads to stiffening of the working or pump diaphragm.

The convex shape of the guide zone ensures that this region first of all leans on the supporting zone of the pump head during the upward stroke and therefore takes over the low-vibration diaphragm guidance. Since, in the case of the previously customary diaphragms, by way of the reciprocating movement and under the influence of vacuum and pressure, this previously uncontrolled region was also in contact, and the guide zone of the working or pump diaphragm according to the invention then leans against the pump head in a reliable, vibration-free and therefore controlled manner, the guide zone therefore makes a substantial contribution to the noise reduction. The supporting zone geometry is adapted to the geometry of the guide zone or diaphragm, with the result that the guide zone and supporting zone geometrically form a convex or concave unit.

A CENTRAL ZONE is provided in a central region of the diaphragm, in which central zone the working or pump diaphragm encloses a diaphragm armature in regions, which diaphragm armature is connected, on its side which faces away from the working or delivery space of the pump head, to a reciprocating drive which is provided for the oscillating reciprocating movement of the working or pump diaphragm. The central zone therefore serves for drive connection to the reciprocating drive and for introducing the reciprocating motion. The diaphragm is fastened, for example, to a connecting rod of the reciprocating drive via the diaphragm armature which is preferably configured as a steel part and stiffens the working or pump diaphragm in its central zone, with the result that the reciprocating motion which is brought about by the reciprocating drive can be introduced into the diaphragm. The central zone is intended at the same time for induction and compressing. The volume change for induction and compressing takes place significantly here.

A COMPENSATION ZONE of the working or pump diaphragm is provided between the guide zone and the central zone, which compensation zone is curved concavely and in the direction of the reciprocating drive in contrast in the unloaded state. The COMPENSATION ZONE which is deflected in the direction of bottom dead center in the stroke center position and therefore in the unloaded state experiences stretching during the upward stroke, with the result that the compensation zone is tensioned tautly at the top dead center. Since the compensation zone therefore permits a greater stroke during the upward stroke of the diaphragm, the compensation zone also at the same time brings about a stress reduction in the case of a great stroke. Since this particular refinement of the working or pump diaphragm which is used according to the invention ensures a reliable and low-vibration movement of the diaphragm during the reciprocating movement, it aids in substantially less noisy operation of the diaphragm pump according to the invention. Since the diaphragm pump according to the invention also permits a greater stroke of the reciprocating drive, and the working or pump diaphragm which is used according to the invention can have a comparatively large-area stiffening central zone in comparison with conventional diaphragms, which central zone ensures the selected shape of the diaphragm independently of the pressure conditions acting on the diaphragm, the diaphragm pump according to the invention is also distinguished by higher performance and a greater suction rate.

Since the guide zone ensures a controlled movement of the diaphragm during the reciprocating movement and since the compensation space also permits a great stroke, the central zone can be configured to be comparatively large and solid in such a way that, in this region, the diaphragm in practice acts in the manner of a reciprocating piston and the working or pump diaphragm of the diaphragm pump according to the invention always maintains the defined shape independently of the pressure forces which act on it, as a result of which a high final pressure can also be achieved. In the case of rising pressure, this also results in a favorable and therefore improved delivery rate curve. One preferred embodiment according to the invention therefore provides that, in comparison with the guide and compensation zones, the diaphragm armature extends over more than half the diameter of the diaphragm part region which defines the working or pump space and is formed by the guide zone, compensation zone and central zone.

It is advantageous if the diaphragm armature is arranged in, and/or vulcanized into, a blind hole which is open toward the reciprocating drive or receiving cavity of this type in the central zone of the working or pump diaphragm.

One preferred development according to the invention which also additionally aids the low-noise running of the diaphragm pump according to the invention provides that, at the top dead center of the working or pump diaphragm, the central zone is spaced apart from an adjacent adaptation zone of the pump head part, which adaptation zone has its shape adapted to the central zone. At the top dead center, the working or pump diaphragm therefore does not bear against the pump head, since this would lead to an impact noise of the diaphragm on the pump head. Since the ADAPTATION ZONE in the pump head, which adaptation zone is adjacent to the central zone of the diaphragm, has its shape adapted to the diaphragm geometry, which is stretched at the top dead center, of the compensation zone and to the rigid central zone, a minimum dead space is ensured. In the adaptation zone, the compensation zone and the central zone of the diaphragm approach one another in the upward stroke.

One embodiment is preferred, in which, in the unloaded state of the working or pump diaphragm, the central zone projects beyond the guide zone of said working or pump diaphragm into the working or pump space.

In order that the pump inlet is closed as early as possible by the working or pump diaphragm, it is advantageous if the pump head part has at least one inlet opening which is arranged there such that it is adjacent to the annular zone of the working or pump diaphragm, which annular zone is provided between the guide zone and compensation zone.

In order that the pump outlet closes as late as possible before the top dead center is reached, one embodiment is preferred, in which the pump head part has at least one outlet opening which is arranged there such that it is adjacent to the central zone of the working or pump diaphragm.

In order to aid the guidance of the diaphragm, which guidance is progressively reliable and low-vibration during the upward stroke of the diaphragm, it is expedient if, during the upward stroke of the working or pump diaphragm, the guide zone bears against the supporting zone of the pump head part in a positively locking and/or frictional manner.

The special refinement of the working or pump diaphragm and the refinement, adapted thereto, of the pump head allow the diaphragm pump according to the invention to be used both as a suction or vacuum pump and as a pressure pump or compressor. In order for it to also be possible to use the diaphragm pump according to the invention in an optimum manner in the pressure range, a diaphragm support is helpful which should be adapted to the tilting angle of the diaphragm in its outer circumferential edge region. One development according to the invention therefore provides that the working or pump diaphragm which is used in a compressor is supported by a diaphragm plate in the annular zone which projects radially beyond the central zone, which diaphragm plate is arranged on that side of the working or pump diaphragm which faces away from the working or pump space.

BRIEF DESCRIPTION OF THE DRAWINGS

Developments according to the invention result from the following description in conjunction with the drawings. In the following text, the invention will be described in even further detail using preferred exemplary embodiments.

In the drawing.

DETAILED DESCRIPTION OF THE PREFERRED EMBODIMENTS

Figure 1:
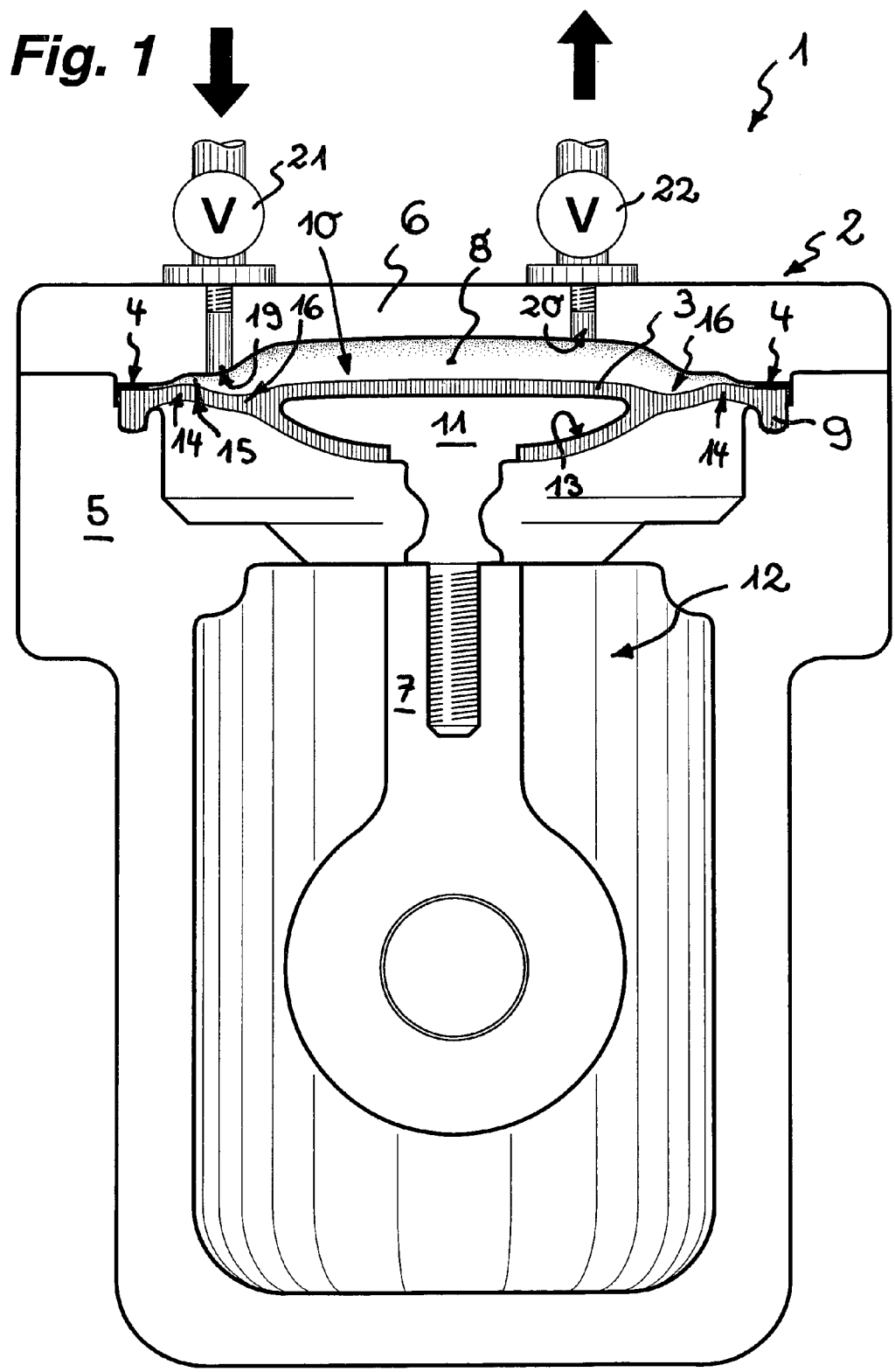
FIG. 1 shows a diaphragm pump which is shown in a longitudinal section, with a working or pump diaphragm which is situated in a stroke center position and therefore in an unloaded state.

FIG. 1 shows a diaphragm pump 1 in a longitudinal section, which diaphragm pump 1 has a working or pump diaphragm 3 in its pump head 2. On its outer circumference, the working or pump diaphragm 3 has a clamping zone 4 which is clamped between two housing parts 5, 6 of a pump housing. This working or pump diaphragm 3 defines a working or delivery space 8 between itself and the housing part 6 which serves as pump head part.

Figure 5:
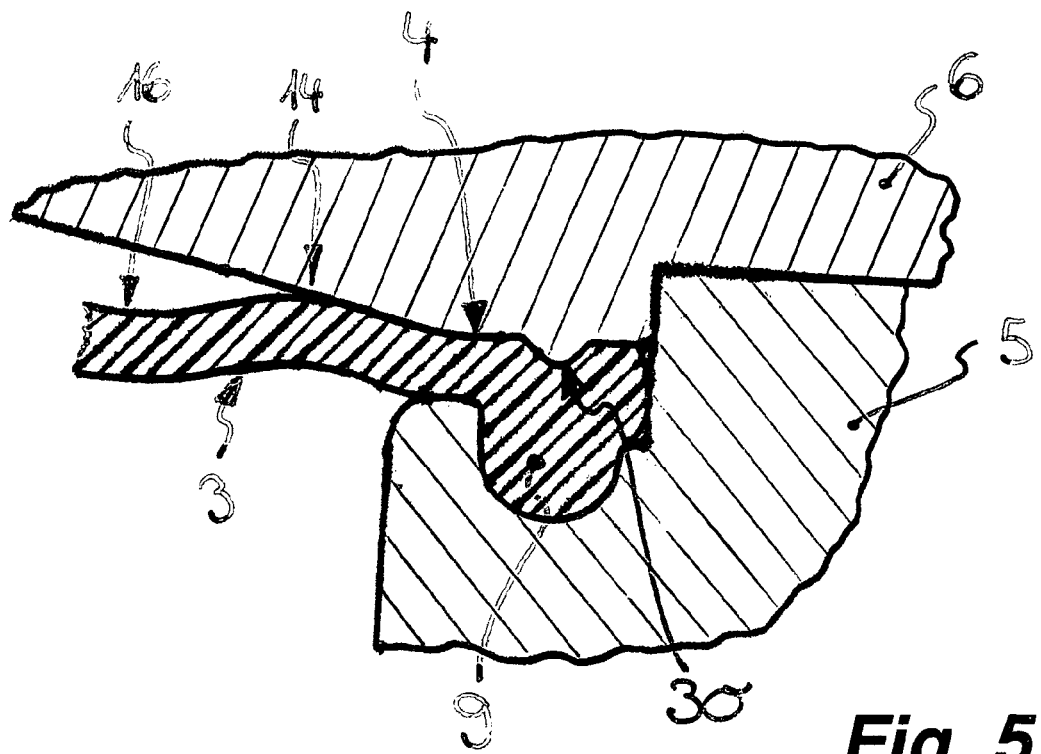
FIG. 5 shows a detailed longitudinal section through the diaphragm pump according to FIGS. 1 to 3 in the region of the clamping zone of the working or pump diaphragm, which clamping zone is clamped between two housing parts.

In the region of its clamping zone 4 which is shown in yet greater detail in FIG. 5 in a detailed longitudinal section, the working or pump diaphragm 3 has an O-ring-like outwardly projecting molding which, in order to position the diaphragm 3, engages by way of a complementary formed recess into that housing part 5, which faces away from the pump head, of the housing parts 5, 6 which clamp the clamping zone between themselves. With the aid of the clamping zone 4, the relative position of the diaphragm 3 and its diaphragm zones is fixed in relation to the pump head 2 and its shape which is adapted to the diaphragm zones. The clamping zone 4 therefore serves to center and/or position the diaphragm 3 in relation to the pump head 2. Moreover, the clamping zone 4 ensures satisfactory sealing of the working or delivery space 8 with respect to the crankcase.

Here, the O-ring-like outwardly projecting molding in the region of the clamping zone 4 is configured as an annular bead 9 which lies on the outside and is held securely and fixedly in a cutout in the housing part 5. The clamping zone 4 seals the working or delivery space 8 to the outside, possibly also in combination with at least one sealing edge which projects on the housing part 5 and/or on the housing part 6 and is preferably circumferential. In the exemplary embodiment which is shown in FIG. 5, said sealing edge 30 which is configured as an annularly circumferential projection is provided on the housing part 6 and is arranged there in such a way that the diaphragm 3 is pressed via its clamping zone 4 into the cutout in the housing part 5 by way of a high pressing force. The clamping zone 4 of the working or pump diaphragm 3 therefore serves to fasten the diaphragm 3 in the housing and to seal the working or delivery space 8 with respect to the housing and the surroundings.

Figure 2:
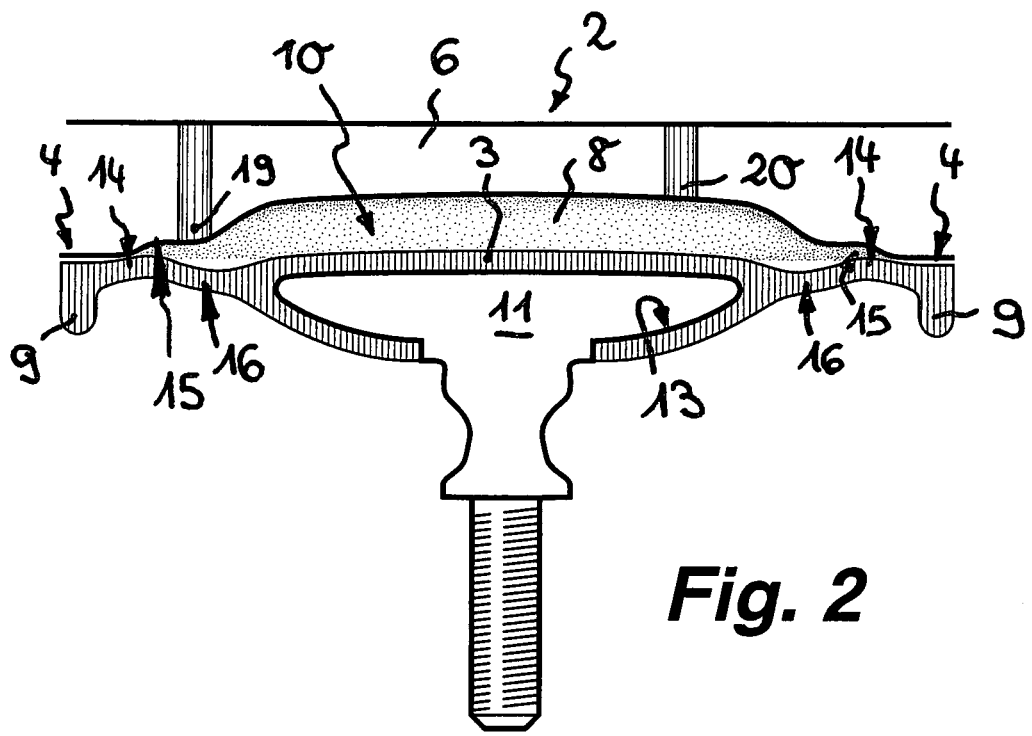
FIG. 2 shows the diaphragm pump from FIG. 1 in a detailed longitudinal section in the region of the working or pump diaphragm which delimits a working or delivery space.

As becomes clear from FIG. 1 and the detailed longitudinal section in FIG. 2, the working or pump diaphragm 3 has a central zone 10, by way of which the diaphragm 3 encloses a substantially mushroom-shaped diaphragm armature 11 in regions. This diaphragm armature 11 which, on its side which faces away from the working or delivery space 8, is connected to a reciprocating drive 12 is arranged in, and vulcanized into, a blind hole 13 which is open toward the reciprocating drive 12 and is provided in the central zone 10 of the diaphragm 3. The diaphragm 3 ensures a closed seal toward the working or delivery space 8, with the result that the diaphragm pump is also distinguished by a high gas impermeability in the central region. Here, the reciprocating drive 12 is configured as a crank mechanism which is connected via a connecting rod 7 to the diaphragm armature 11. The stroke center point has to lie as far below the crank mechanism axis as is required to tension the compensation zone of the diaphragm 3 at the top dead center.

The annular zone which is arranged adjacently to the clamping zone 4 is configured as a guide zone 14 which is curved convexly in the unloaded state of the working or pump diaphragm 3, projects beyond the clamping zone 4 into the working or delivery space 8, and by way of which, during the reciprocating movement of the diaphragm 3, the working or pressure diaphragm 3 rolls on a complementarily formed annular or supporting zone 15 in the pump head part 6.

During the reciprocating movement, the working or pump diaphragm 3 rolls on the complementarily formed annular or supporting zone 15 of the pump head 2. Here, by way of its guide zone 14 which is intended to guide the diaphragm 3, the diaphragm 3 is supported progressively from the outside to the inside on the supporting zone 15 of the pump head part 6, with the result that the radial forces in the working or pump diaphragm 3 which are necessary to increase the radius are absorbed by the supporting zone 15 progressively reliably and in a vibration-free manner. In combination with the adapted geometry of the pump head 6, the convex configuration of the guide zone 14 leads to stiffening of the working or pump diaphragm 3. The convex shape of the guide zone 14 ensures that, during the upward stroke, this region first of all leans on the supporting zone 15 of the pump head 2 and therefore takes over the low-vibration diaphragm guidance. Since, in the case of the previously customary diaphragms, by way of the reciprocating movement and under the influence of vacuum and pressure, this previously uncontrolled region was also in contact, and the guide zone 14 of the working or pump diaphragm 3 shown here then leans against the pump head 2 in a reliable, vibration-free and therefore controlled manner, the guide zone 14 therefore makes a substantial contribution to the noise reduction. Since, during the upward stroke of the working or pump diaphragm 3, the guide zone 14 bears positively and frictionally as well as progressively from the outside to the inside against the supporting zone 15 of the pump head part 6, the diaphragm 3 is held in the radial direction on the supporting zone 15 of the pump head part 6 during the upward stroke and is anchored almost fixedly. This precisely defined and low-vibration diaphragm guidance contributes to considerable noise reduction during the operation of the diaphragm pump 1.

A compensation zone 16 of the working or pump diaphragm 3 is provided between the guide zone 14 and the central zone 10, which compensation zone 16 is curved concavely and in the direction of the reciprocating drive 12 in contrast in the unloaded state. The compensation zone 16 which is deflected in the direction of the bottom dead center in the stroke center position and therefore in the unloaded state experiences stretching during the upward stroke, with the result that the compensation zone 16 is tensioned tautly at the top dead center. Since the compensation zone 16 therefore permits a greater stroke during the upward stroke of the diaphragm, the compensation zone 16 also at the same time brings about a stress reduction in the diaphragm 3 in the case of a great stroke. The compensation zone 16 permits an increase in the diaphragm stroke with identical external dimensions of the diaphragm, and reduces the diaphragm stresses, which has a positive effect on the service life. It is possible to coat the diaphragm 3 with Teflon or other materials as protection against aggressive media, the compensation zone 16 specifically in these embodiments permitting a greater stroke.

It becomes clear from FIGS. 1 and 2 that at least one inlet opening 19 is provided in the pump head part 6, which inlet opening 19 is arranged there adjacently to that annular zone of the working or pump diaphragm 3 which is provided between the guide zone 14 and compensation zone 16. An inlet valve 21 is connected upstream of the inlet opening 19 in the inflow direction. The pump head part 6 also has at least one outlet opening 20 which is arranged there adjacently to the central zone 10 of the working or pump diaphragm 3. An outlet valve 22 is connected downstream of the outlet opening 20 in the outflow direction.

Figure 4:
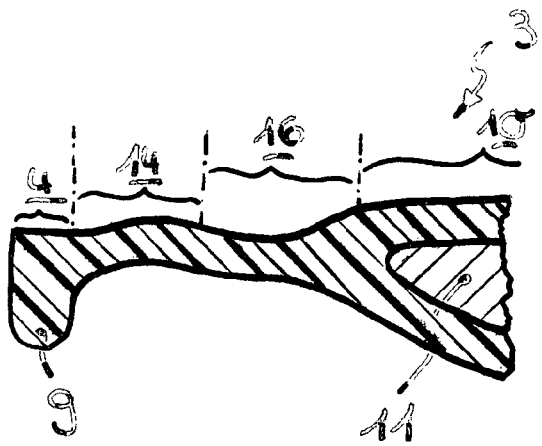
FIG. 4 shows a detailed longitudinal section through the working or pump diaphragm, the various diaphragm zones of said working or pump diaphragm being marked.

It becomes clear from FIGS. 1, 2 and 4 that that elastomeric material of the working or pump diaphragm 3 which encloses the diaphragm armature 11 on both sides has approximately the same material or layer thickness on both sides of the diaphragm armature 11.

As becomes clear in the detailed longitudinal section through the working or pump diaphragm 3 in FIG. 4, the diaphragm 3 has the clamping zone 4 on its outer diaphragm circumference, which clamping zone 4 is adjoined in the direction to the inside by the guide zone 14, the compensation zone 16 and the central zone 10 in the center of the diaphragm 3. It also becomes clear from FIG. 4 that, in the unloaded state of the working or pump diaphragm 3, the guide zone 4 projects into the working or delivery space 8 at least beyond that edge region of the clamping zone 3 which adjoins the guide zone 4.

The diaphragm pump 1 which is equipped with the zone diaphragm 3 is distinguished by the fact that the combination of final vacuum, final pressure, overall size, delivery rate, sealing action and diaphragm service life achieves new best values.

Figure 3:
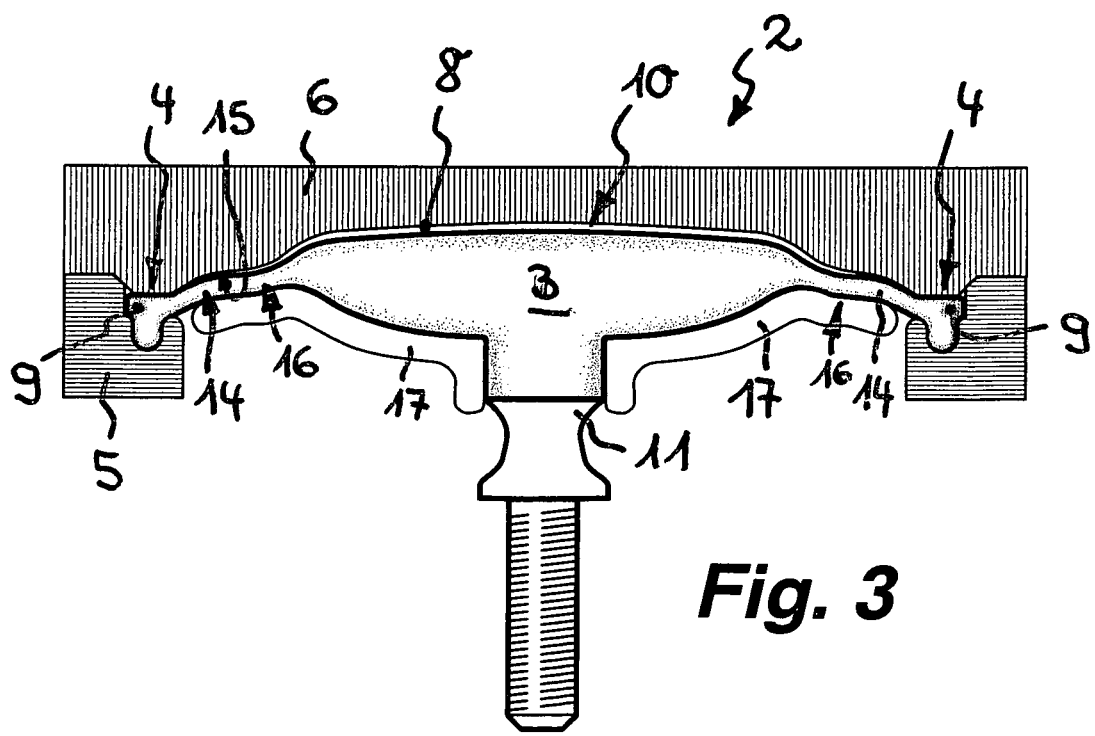
FIG. 3 shows a diaphragm pump which is comparable with FIGS. 1 and 2 and is shown in a detailed longitudinal section in the region of its working or pump diaphragm which is situated here at the top dead center, the working or pump diaphragm of the diaphragm pump which is used here as a pressure pump or as a compressor being supported by a diaphragm plate in the annular zone which projects radially beyond the central zone.

FIG. 3 shows a diaphragm pump 1 which is configured as a pressure pump or as a compressor, in the region of its working or delivery space 2. The diaphragm pump 1 in FIG. 3 has a working or pump diaphragm 3 which is configured according to FIGS. 1 and 2. It becomes clear from FIG. 3 that the special refinement of the working or pump diaphragm 3 and the refinement, adapted thereto, of the pump head 2 allow the working or pump diaphragm to be used both as a suction or vacuum pump and as a pressure pump or compressor. In the diaphragm pump 1 which is shown in FIG. 3 and is used as a pressure pump or as a compressor, a diaphragm support is provided which is configured here as a diaphragm plate 17 which supports the working or pump diaphragm 3 in the annular zone which projects radially beyond the central zone 10, which diaphragm plate is arranged on that side of the working or pump diaphragm which faces away from the working or pump space. At the top dead center which is shown in FIG. 3, said diaphragm plate 17 bears with its full surface area against the underside of the working or pump diaphragm 3, with the result that said working or pump diaphragm 3 also cannot be deformed in a performance-reducing manner by high pressure differences on the diaphragm sides which lie opposite one another. On its outer circumferential edge region, the diaphragm plate 17 is angled away in the direction of the reciprocating drive in such a way that the diaphragm plate 17 does not additionally load the working or pump diaphragm 3 during the reciprocating movement.

The invention claimed is:

1. A diaphragm pump (1) comprising a working or pump diaphragm (3) in at least one pump head (2), said working or pump diaphragm (3) is clamped by way of a clamping zone (4) which is arranged on an outer circumference thereof between two housing parts (5, 6) of a pump housing and defines a working or delivery space (8) between itself and a pump head part (6), an annular zone of the working or pump diaphragm that is arranged adjacent to the clamping zone (4) is configured as a guide zone which is curved convexly in an unloaded state of the working or pump diaphragm and projects into the working or delivery space (8), and which encloses, in a central zone (10), a diaphragm armature (11), the diaphragm armature (11) being connected to a reciprocating drive (12) on a side thereof which faces away from the working or delivery space (8) of the at least one pump head (2), said reciprocating drive (12) is provided for oscillating reciprocating movement of the working or pump diaphragm (3), a compensation zone (16) of the working or pump diaphragm is provided between the guide zone (14) and the central zone (10), the compensation zone (16) is curved concavely in a direction of the reciprocating drive (12) in contrast in the unloaded state, and during the reciprocating movement, the working or pump diaphragm (3) rolls with the guide zone (14) on a complementarily formed edge or supporting zone (15) of the pump head (2), and the compensation zone (16) experiences stretching during an upward stroke, with a result that the compensation zone is tensioned taughtly at a top dead center position.

2. The diaphragm pump as claimed in claim 1, wherein in comparison with the guide and the compensation zones (14, 16), the diaphragm armature (11) extends over more than half a diameter of the diaphragm part region which defines the working or delivery space (8) and is formed by the guide zone (14), compensation zone (16) and central zone (10).

3. The diaphragm pump as claimed in claim 1, wherein the working or pump diaphragm (3) has, starting from a diaphragm outer circumference and moving in a direction to the inside, the clamping zone (4), the guide zone (14), the compensation zone (16) and the central zone (10).

4. The diaphragm pump as claimed in claim 1, wherein the working or pump diaphragm (3) has at least one positioning formed recess or outwardly projecting molding in a region of the clamping zone (4), said at least one of the positioning formed recess or outwardly projecting molding, in order to position the working or pump diaphragm (3), interacts with at least one of a complementary outwardly projecting molding or formed recess in at least one of the housing parts (5, 6) which clamp the working or pump diaphragm (3) therebetween.

5. The diaphragm pump as claimed in claim 1, wherein at least one O-ring-like positioning outwardly projecting molding is formed integrally onto the working or pump diaphragm (3).

6. The diaphragm pump as claimed in claim 1, wherein the diaphragm armature (11) is at least one of arranged in, or vulcanized into, a blind hole (13) which is open toward the reciprocating drive (12) or receiving cavity in the central zone (10) of the working or pump diaphragm (3).

7. The diaphragm pump as claimed in claim 1, wherein at the top dead center of the working or pump diaphragm (3), the central zone (10) is spaced apart from an adjacent adaptation zone (18) of the pump head part (6), which adaptation zone (18) has a shape adapted to the central zone (10).

8. The diaphragm pump as claimed in claim 1, wherein in the unloaded state of the working or pump diaphragm (3), the central zone (10) projects beyond the guide zone (14) of said working or pump diaphragm (3) into the working or pump space (3).

9. The diaphragm pump as claimed in claim 1, wherein the pump head part (6) has at least one inlet opening (19) which is arranged is adjacent to the annular zone of the working or pump diaphragm, said annular zone is provided between the guide zone (14) and compensation zone (16).

10. The diaphragm pump as claimed in claim 9, wherein the pump head part (6) has at least one outlet opening (20) which is arranged adjacent to the central zone (10) of the working or pump diaphragm (3).

11. The diaphragm pump as claimed in claim 1, wherein during the upward stroke of the working or pump diaphragm (3), the guide zone (10) bears against the supporting zone (15) of the pump head part (6) in at least one of a positively locking or frictional manner.

12. The diaphragm pump as claimed in claim 11, wherein the guide zone (10) bears against the supporting zone (15) progressively from an outside to an inside.

13. The diaphragm pump as claimed in claim 1, wherein the working or pump diaphragm (3) is used in a compressor or a pressure pump and is supported by a diaphragm plate (17) in the annular zone which projects radially beyond the central zone (10), said diaphragm plate (17) is arranged on that side of the working or pump diaphragm (3) which faces away from the working or delivery space (8).

\* \* \* \* \*